US009483309B2

(12) United States Patent
Fankhauser et al.

(10) Patent No.: US 9,483,309 B2
(45) Date of Patent: *Nov. 1, 2016

(54) ELIMINATING EXECUTION OF JOBS-BASED OPERATIONAL COSTS OF RELATED REPORTS

(71) Applicant: International Business Machines Corporation, Armonk, NY (US)

(72) Inventors: Michael Fankhauser, DN Karkur (IL); Marc N. Haber, Efrat (IL); Benjamin Halberstadt, Jerusalem (IL); Roger K. Hecker, Efrat (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/062,712

(22) Filed: Mar. 7, 2016

(65) Prior Publication Data

US 2016/0170803 A1    Jun. 16, 2016

Related U.S. Application Data

(63) Continuation of application No. 14/088,501, filed on Nov. 25, 2013, now Pat. No. 9,336,504.

(51) Int. Cl.
*G06F 9/50* (2006.01)
*G06Q 10/06* (2012.01)
*G06F 9/48* (2006.01)
*G06F 17/30* (2006.01)

(52) U.S. Cl.
CPC ........... *G06F 9/5011* (2013.01); *G06F 9/4881* (2013.01); *G06F 17/30563* (2013.01); *G06Q 10/0631* (2013.01); *G06Q 10/0639* (2013.01)

(58) Field of Classification Search
None
See application file for complete search history.

(56) References Cited

U.S. PATENT DOCUMENTS

2005/0108714 A1    5/2005    Geye et al.
2013/0179371 A1    7/2013    Jain et al.

*Primary Examiner* — Emerson Puente
*Assistant Examiner* — Zhi Chen
(74) *Attorney, Agent, or Firm* — Cantor Colburn LLP (57) ABSTRACT

Optimizing operational costs in a computing environment includes identifying high-cost jobs that are executed to generate one or more reports in the computing environment, identifying one or more reports the generation of which is dependent on the execution of the high-cost jobs, and culling at least a first job from among the high-cost jobs, in response to determining that a benefit achieved from the reports that depend on the first job does not justify costs associated with generating the reports.

1 Claim, 4 Drawing Sheets

ELIMINATING EXECUTION OF JOBS-BASED OPERATIONAL COSTS OF RELATED REPORTS

PRIORITY

This application is a continuation of and claims priority from U.S. patent application Ser. No. 14/088,501, filed on Nov. 25, 2013, entitled "ELIMINATING EXECUTION OF JOBS-BASED OPERATIONAL COSTS OF RELATED REPORTS", the entire contents of which are incorporated herein by reference.

BACKGROUND

The disclosed subject matter relates generally to optimizing execution of jobs in a computing environment and, more particularly, to strategically eliminating jobs according to the costs for generating reports associated with the jobs.

Many enterprises rely on business intelligence (BI) reports for day-to-day decision making. BI reports are generated by way of extract, transform, and load (ETL) jobs, which require computing resources (e.g., CPU, memory, etc.) to run. Thus, each ETL job has an operational cost that can be calculated based on the cost of processing resources allocated to that job.

In general, the number of jobs proportionally grows with the number of BI reports generated. If sufficient capacity and proper planning are not present, the computing resources may become overloaded and fail to properly support the jobs. It is desirable to maintain sufficient capacity to support the important jobs, while culling the less important jobs or reports to lower operational costs.

Typically, a human operator examines each report to see if the report meets certain cost-benefit criteria based on which the report and the supporting jobs may be decommissioned. This process is a manual task and expensive. Further, the process typically does not result in substantial savings, due to lack of insight about operational costs of individual reports.

SUMMARY

In accordance with embodiments, methods, systems and computer program products for optimizing operational costs in a computing environment are provided. A method includes identifying high-cost jobs that are executed to generate one or more reports in the computing environment, identifying one or more reports the generation of which is dependent on the execution of the high-cost jobs, and culling at least a first job from among the high-cost jobs, in response to determining that a benefit achieved from the reports that depend on the first job does not justify costs associated with generating the reports.

A system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE SEVERAL VIEWS OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION

A portion of this disclosure may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
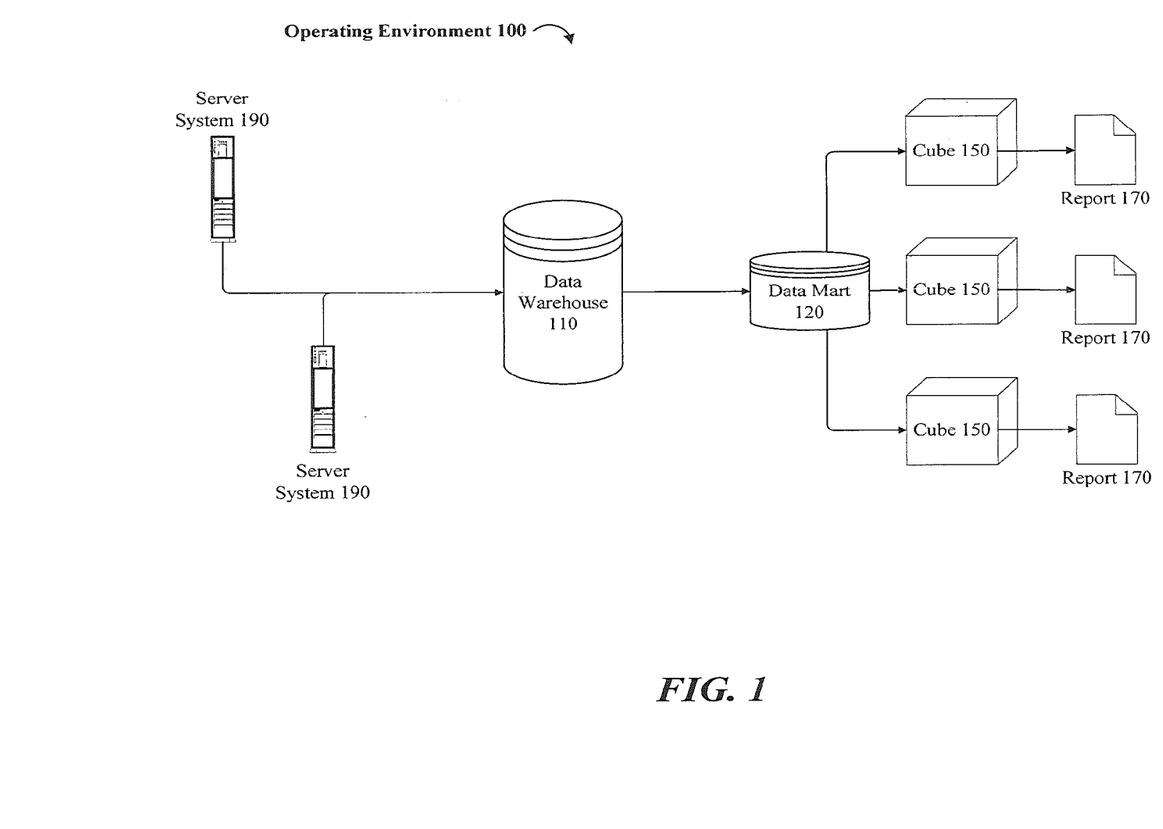
FIG. 1 illustrates an exemplary computing environment in accordance with one or more embodiments, wherein a data warehouse and a data mart are implemented to aggregate data for the production of BI reports.

Referring to FIG. 1, in the exemplary operating environment 100, one or more server systems 190 may be utilized to process day-to-day transactions in a business enterprise, or other computing environments. Server systems 190 may provide relevant data to a data warehouse 110 by way of scheduling and executing computer implemented jobs. An ETL tool may be used to move selected data to domain-specific data marts 120 to facilitate reporting, analysis and decision making in the operational environment 100.

Cubes 150 may be utilized for the purpose of filtering or aggregating data from a data warehouse 110 or a data mart 120 to support the efficient generation of reports 170. For example, a cube 150 may be implemented to filter out information included in a data mart 120 or data warehouse 110 to facilitate the generation of a report 170 that includes sales information for a product on a quarterly basis, where the timing data stored in the data warehouse 110 or the data mart 120 may provide the sales data on a daily or weekly basis, for example.

Data in data marts 120 or cubes 150 may be processed by way of one or more BI tools (e.g., IBM Cognos Enterprise®) to generate one or more reports 170. To maintain an efficient reporting process, a three-stage approach may be implemented in accordance with one embodiment. In a first stage, high-cost jobs that are scheduled for execution to generate one or more reports 170 are identified. The cost of a job may be determined based on processor usage at a certain time interval (e.g., during peak hours). Once the high-cost jobs are identified, in a second stage, reports associated with those jobs are identified. In a third stage, certain jobs are selected for elimination to the extent that the reports depending on the selected jobs do not justify the cost associated with those jobs.

In eliminating the unwanted reports, in one embodiment, the interdependencies between multiple jobs and reports are taken into consideration so that, for example, if one job contributes to more than one report, a job associated with a low value report is not eliminated if that job is also needed for a high value report. As provided in further detail below, reports may be grouped together as a function of the set of common reports that are dependent on a job, such that aggregated cost savings may be achieved by removing a group of reports that depend on a common set of jobs.

To determine the operational costs associated with a job, in one embodiment, the number of CPUs deployed to run the job is considered. This is because each additional CPU deployed may incur hardware costs and software licensing costs associated with the corresponding database, application server and ETL engine that are utilized to facilitate job execution. In one implementation, since the number of CPUs deployed increases during a peak usage window, narrowing the peak usage window helps reduce the number of CPUs required to run the jobs and therefore the operational costs.

Figure 2:
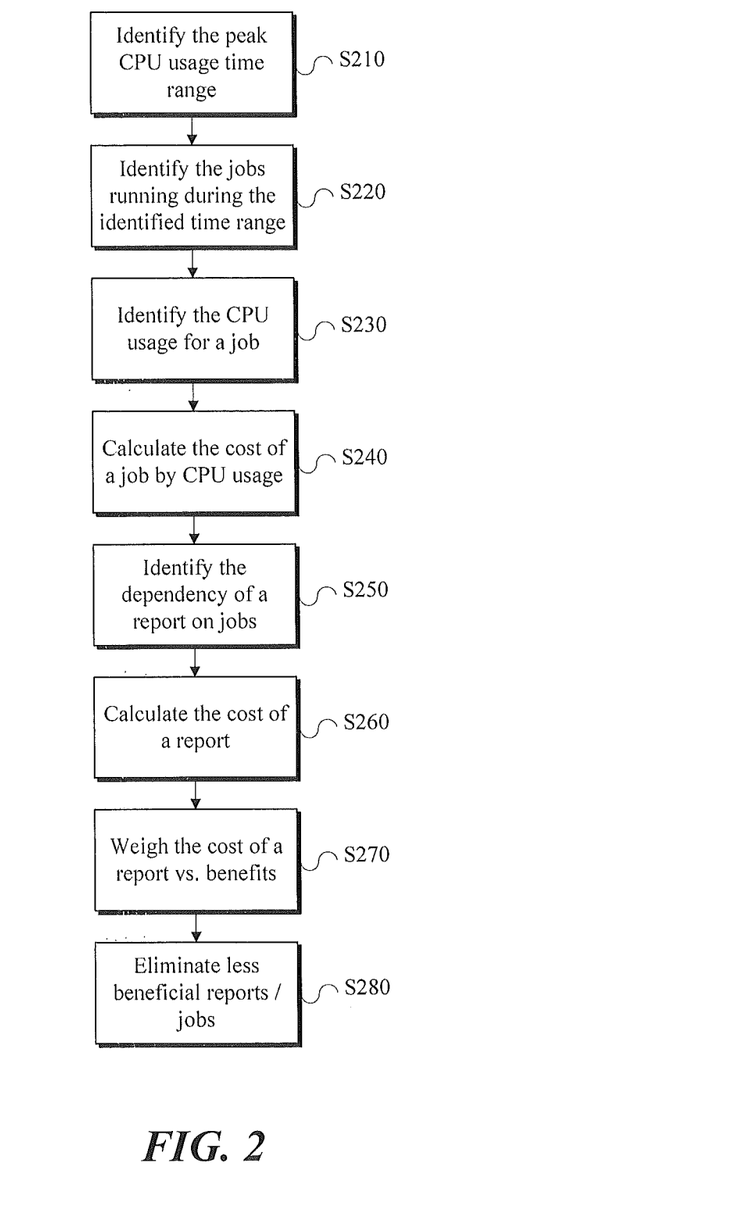
FIG. 2 is a flow diagram of an exemplary method for reducing the costs associated with the generation of reports in accordance with one embodiment.

Referring to FIG. 2, in one embodiment, usage metrics for a job execution environment may be determined by identifying the peak CPU usage time range (S210), identifying the jobs running during that time range (S220), and identifying the CPU usage or usage contribution factor for a job (S230). Once the above metrics are calculated, the job costs by CPU usage may be calculated (S240). Below, a detailed example process (e.g., algorithm) is provided that facilitates the translation of CPU usage metrics to a more meaningful measure to indicate the associated job costs.

In one implementation, a data lineage tool may be used to identify the dependency of a report on one or more jobs and determine the cost for each report (S250, S260). In this manner, the reports that contribute to peak CPU usage (which contribute disproportionately to the operational costs) may be detected. These reports may be the proper candidates for culling. Thus, in one implementation, the benefits (e.g., business need, importance, etc.) of a candidate report is examined and weighed against the report's cost (S270) by way of a cost-benefit analysis, for example. The jobs or the dependent reports that do not meet a certain criteria are eliminated (S280).

In one example scenario, InfoSphere Information Server that includes a DataStage ETL engine may be used to schedule and run the jobs in an ETL environment. In this example, a DataStage operational console may be used to provide CPU metrics for each job run. A metadata asset manager my be utilized for integration with Cognos BI reports that includes Metadata Workbench which deduces a data lineage graph from the DataStage jobs to the Cognos BI reports. Without limitation, the following exemplary process may be implemented in one embodiment:

a) The DataStage Operational Console may be used to:
Identify the peak CPU usage time range.
Identify the DataStage jobs running during that time range. For a job, find its CPU usage and determine the individual cost of the job based on its CPU usage.
b) Using Metadata Workbench invoke a data lineage tool for a job to identify the downstream BI reports that are using the job data either directly or indirectly.
c) Determine the individual cost of a report based on the costs of the jobs which provide the report's data.
d) Determine the cost for a report based the analysis above calculated metrics and eliminate the reports whose business needs do not justify their cost together with the jobs that provide their data.

Employing the above process to cull jobs and reports will reduce the peak CPU usage. The above process may be repeated iteratively to identify eliminate additional jobs and reports until a threshold condition is reached. For the purpose of providing a clarifying detailed example, in the following, a specific exemplary implementation is introduced. It is noteworthy, however, that the specific features or scenarios provided are not to be construed to limit the scope of the claimed subject matter to such limitations.

In one example implementation, the unit of report cost may not be represented as currency, but rather as a comparison to one another report in terms of relative CPU usage. For example, if there are 5 reports that are being compared, it may be adequate to provide information that indicates: report_X uses 40% of the resources while the other reports use 15% of the resources each. In this example, report_X is the most expensive and therefore would be the first candidate for the cost-benefit analysis and elimination. That is, if measuring the report's business value against its cost does not make sense, then report_X and jobs on which that report depends may be eliminated, provided that those jobs are not needed for generating the other reports.

Job costs may be calculated based on a DataStage operational console indication of the percentage of CPU usage for a job that is run during a peak window. This percentage indicates the cost number that is associated with the job. Jobs that do not run during the peak window do not impact the peak usage if culled. Therefore, in one implementation cost associated with such jobs may be considered zero. Once the job costs are determined, then the cost associated with the corresponding reports may be calculated.

By way of example, consider a scenario where there are two reports (R1, R2) and three jobs (J1, J2, J3) running during the peak usage window such that:

J1 moves data that is needed for R1. The cost of J1 is 5.
J2 moves data that is needed for R2. The cost of J2 is 6.
J3 moves data that is needed for R1 and R2. The cost of J3 is 9.

In the above example, if R1 is deemed unnecessary and removed then J1 can be removed since it is providing data only to R1. However, J2 and J3 cannot be removed, since J2 and J3 are providing data also to R2. As such, removing R1 will save running J1 and therefore will save the cost of 5.

On the other hand, in the above example, if R2 is deemed unnecessary and removed, then J2 may be removed, since it is providing data only to R2. J1 and J3 may not be removed, since J1 and J3 are providing data also to R1. As such, removing R2 will save running J2 and therefore will save the cost of 6.

In a different scenario, if R1 and R2 are both deemed unnecessary and removed then J1, J2 and J3 may all be removed since they are providing data only to R1 and R2. As such, removing R1 and R2 will save the cost of 5+6+9, which is 20.

As provided in the above example scenarios, the cost savings achieved by removing two reports is more than the aggregate savings achieved by removing each report independently. As shown above, J3 could be removed and its cost saved if both R1 and R2 were removed.

In accordance with one implementation, to determine the operational cost of a report, it may be important to distinguish between the cost savings achieved by removing an individual report vs. the cost savings achieved by removing a collection of reports, where such collection of reports represents the full set of reports that are dependent on a single set of jobs.

In other words, the individual cost of a report may be determined by the cost saved by removing only the report. In one implementation, data lineage results may be used to find the jobs contributing data to a particular report. In one example implementation, the related operating costs for a job may be assigned according to the following, for example:

If the job is not executing during the highest peak of CPU usage, then its individual cost is zero.

If the job is executing during the highest peak of CPU usage but is needed by other reports too, then its individual cost is zero.

If the job is executing during the highest peak of CPU usage and is needed only by a particular report, then the job cost is added to the reports individual cost.

Based on the above, the cost of a report may be calculated as the aggregate cost of all jobs that contribute to the report and the collective cost of a "report group" may be determined as the cost saved by removing a group of reports. As noted earlier, data lineage results may be used to determine the jobs contributing data to a group of reports. For a job the associated costs with that job may be assigned based on the following, for example:

If the job is not executing during the highest peak of CPU usage then its cost is zero.

If the job is executing during the highest peak of CPU usage but it is needed by reports not in this group then its cost is zero.

If the job is executing during the highest peak of CPU usage and it is needed by only this report group then its cost is added to the report group's cost.

In one implementation, the cost of the report group is the aggregate cost of jobs that contribute to the report group. In the following, another detailed example is provided, without limitation, to help better understand the methodology discussed above.

Non-Limiting Example:

Reviewing a DataStage CPU utilization graph for an ETL operational environment may indicate peak usage on the 21st of November between 01:00 am and 03:30 am. The jobs that were executing during this peak may be the jobs that have the highest real cost. Removing these jobs real savings may be achieved. In this example, an operation console may be accessed to find the jobs that were running on the 21st of November between 01:00 am and 03:30 am. For example, the operation console may indicate that a job "loadDW EMEA" was executing during the peak and the related CPU usage was 15%. Further investigation may further indicate that there were four jobs executing during the peak usage window and the job costs are 8, 12, 9 and 15, for example.

A data lineage tool may be used for the target jobs and the reports that depend on the target jobs may be found. For example, the data lineage tool may provide the following lineage summary:

The job "loadDW EMEA" is feeding only R1 its cost is 15.

The job J1 is feeding reports R2 and R3 its cost is 12.

The job J2 is feeding reports R1, R2 and R3 its cost is 9.

The job J3 is feeding reports R1, R2 and R3 its cost is 8.

Consider a scenario with a single job that costs 15 and contributes to two different reports: R1 and R2. We would like to determine how does the job costs are attributed to R1 separately, because it is not fair or correct to say that R1 cost is 15, since the cost 15 is also needed for R2. To resolve this issue, the following costs are considered:

R1 individual cost is 0

R2 individual cost is 0

R1 and R2 collective cost is 15

Based upon the lineage summary and the calculated job costs, the reports costs may be determined as follows:

Individual Costs:

R1=15—The job "loadDW EMEA" is only required for R1 and the cost of this job is 15. No other jobs running during the peak contribute solely to this report R2=0—The jobs (J1, J2, J3) running during the CPU peak that contribute to this report also contribute to other reports R3=0—The jobs (J1, J2, J3) running during the CPU peak that contribute to this report also contribute to other reports Collective Costs:

The cost of collection (R2, R3) is 12—Job J1 is executing during the peak CPU usage and contributes solely to these reports, the cost of J1 is 12 and therefore the cost of this collection is 12

The cost of collection (R1, R2, R3) is 44—Jobs J1, J2, J3 and "loadDW EMEA" are executing during the peak CPU usage and contribute solely to these reports, their costs are 12, 9, 8, 15 respectively and therefore the cost of this collection is 44

Based on the above, a human operator or a computer implemented system may be able to understand that culling individual reports R2 or R3 will not result in costs saving. However, the following actions may provide substantial cost savings:

Cull R1 and save 15

Cull R2 and R3 and save 12

Cull R1, R2 and R3 and save 44

As shown, culling R1 and the corresponding dependent jobs is more impactful than culling both R2 and R3 and all their dependent jobs. According to the above implantations, the individual and collective costs of one or more jobs and the reports that depend on such jobs may be calculated, so that the jobs and reports that do not meet a cost benefit analysis may be properly eliminated.

Advantageously, using the above methodology, costs associated with adding additional hardware or software licensing for different system components may be avoided or reduced. Further, the need for hiring additional human operators, and human-related errors or shortcomings in removing non-impactful reports due to lack of insight into the operational cost of each report may be also eliminated.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. The methods and processes, when performed by a general purpose computing system or machine, convert the general purpose machine to a specific purpose machine.

Figure 3:
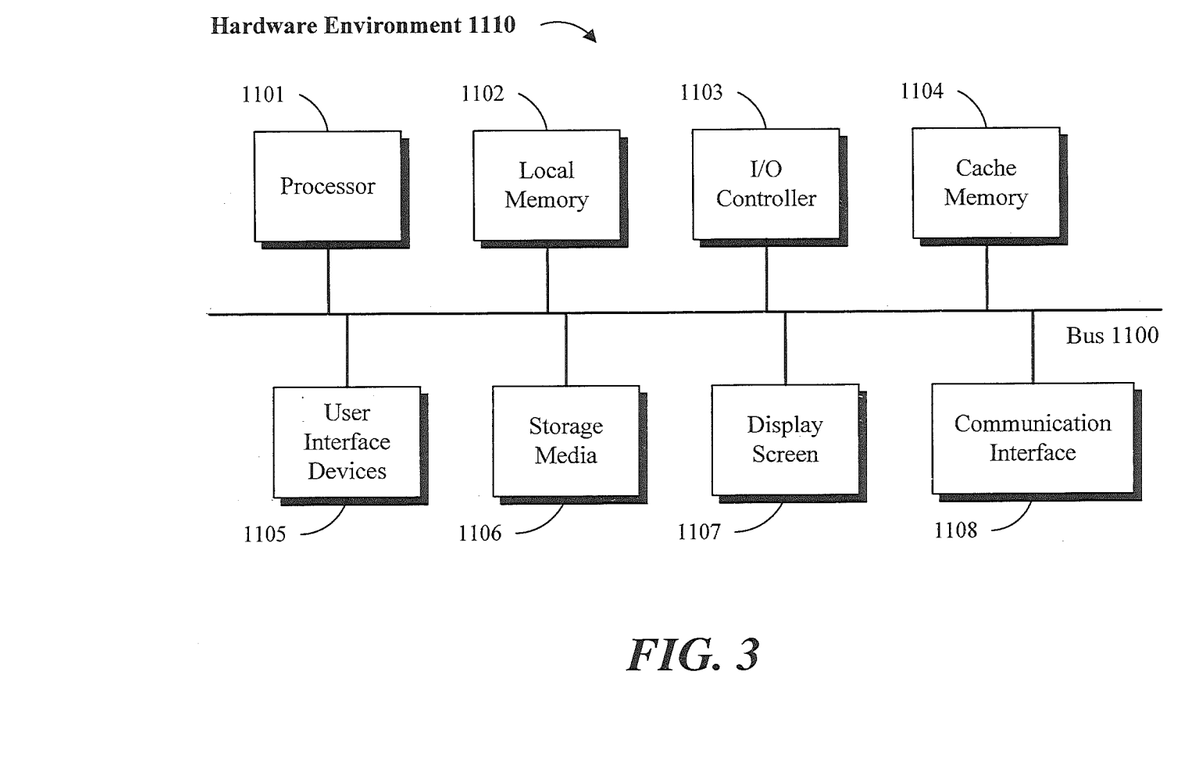
FIGS. 3 and 4 are block diagrams of hardware and software environments in which the disclosed systems and methods may operate, in accordance with one or more embodiments.
Figure 4:
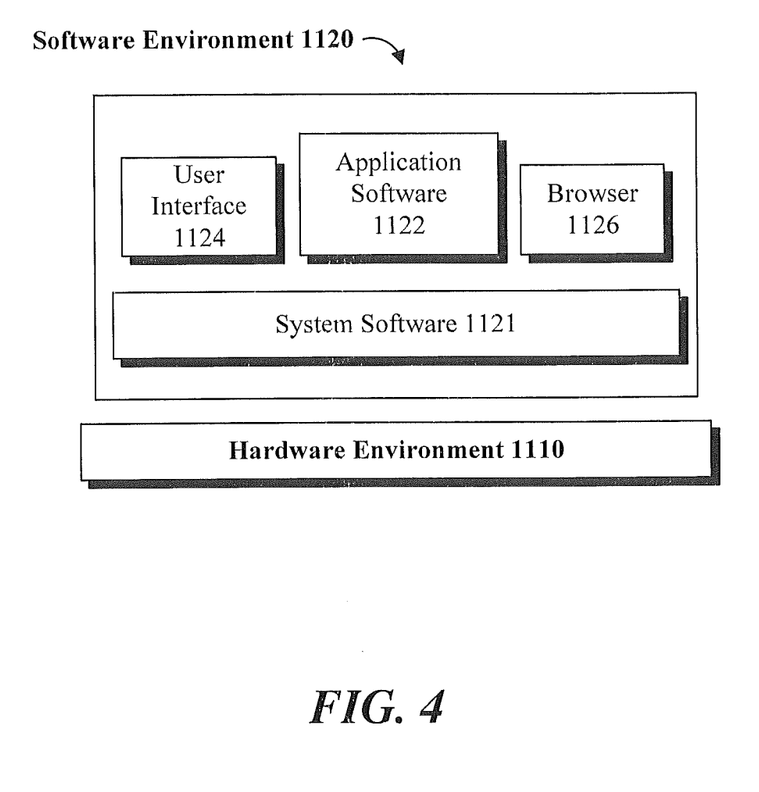

Referring to FIGS. 3 and 4, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 3, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of the exemplary software elements may be also encoded in the hardware elements by way of configured and programmed processors, application specific integrated circuits (ASICs), field programmable gate arrays (FPGAs) and digital signal processors (DSPs), for example.

Referring to FIG. 4, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to the embodiments without limiting or departing from the generally intended scope. These and various other adaptations and combinations of the embodiments provided here are within the scope of the disclosed subject matter as defined by the claims and their full set of equivalents.

What is claimed is:

1. A computer system for optimizing operational costs in a computing, environment, comprising:

a processor; and a memory storing computer executable instructions having a first logic unit configured to identify one or more jobs from a plurality of jobs that are executed to generate one or more reports in the computing environment;

a second logic unit configured to identify one or more reports, wherein generation of the one or more reports is dependent on the one or more jobs identified; and a third logic unit configured to cull at least a job from the one or more jobs identified, in response to determining that a benefit achieved from the one or more reports that depend on the job does not justify costs associated with generating the one or more reports, when executed by the processor, the computer executable instructions cause the processor to perform:

identifying, via the first logic unit, one or more high-cost jobs from the plurality of jobs that are executed to generate the one or more reports in the computing environment by determining costs associated with generation of the one or more reports as a function of computer resource usage; and repeatedly performing one or more of, until a threshold condition is reached:

identifying, via the second logic unit, one or more high-cost reports from among the one or more reports identified, wherein generation of the one or more high-cost reports identified is dependent on the one or more high-cost jobs identified; and culling, via the third logic unit, at least a first job from among the one or more high-cost jobs identified, in response to determining that a benefit achieved from the one or more high-cost reports identified that depend on the first job does not justify costs associated with generating the one or more high-cost reports, wherein costs associated with generating the one or more high-cost reports are calculated based on aggregated cost of all of the individual job on which the reports depend;

wherein cost of the individual job is determined by following:

a) if the job is not executing during the highest peak of resource usage, then its individual cost is zero; and b) if the job is executing during the highest peak of resource usage but is needed by other reports too, then its individual cost is zero; and c) if the job is executing during the highest peak of resource usage and is needed only by a particular report, then the job cost is added to the report's individual cost.

* * * * *